United States Patent
Le Guennec

(10) Patent No.: US 10,917,828 B2
(45) Date of Patent: Feb. 9, 2021

(54) SYSTEM FOR STEERING THE TRAFFIC OF A ROAMING USER, METHODS, UNIT, AND PLATFORM USED IN THIS SYSTEM

(71) Applicant: Orange, Paris (FR)

(72) Inventor: Philippe Le Guennec, Paris (FR)

(73) Assignee: ORANGE, Paris (FR)

( * ) Notice: Subject to any disclaimer, the term of this patent is extended or adjusted under 35 U.S.C. 154(b) by 46 days.

(21) Appl. No.: 16/099,022

(22) PCT Filed: May 2, 2017

(86) PCT No.: PCT/FR2017/051041
§ 371 (c)(1),
(2) Date: Nov. 5, 2018

(87) PCT Pub. No.: WO2017/191403
PCT Pub. Date: Nov. 9, 2017

(65) Prior Publication Data
US 2019/0141600 A1    May 9, 2019

(30) Foreign Application Priority Data

May 4, 2016    (FR) ..................................... 16 54065

(51) Int. Cl.
*H04W 8/12*        (2009.01)
*H04W 28/02*       (2009.01)
(Continued)

(52) U.S. Cl.
CPC ............. *H04W 40/12* (2013.01); *H04W 8/12* (2013.01); *H04W 28/0268* (2013.01); *H04W 40/20* (2013.01); *H04W 48/08* (2013.01); *H04W 72/08* (2013.01); *H04W 76/18* (2018.02); *H04W 60/04* (2013.01)

(58) Field of Classification Search
CPC ................. H04W 18/06; H04W 18/18; H04W 60/00–04; H04W 8/12
See application file for complete search history.

(56) References Cited

U.S. PATENT DOCUMENTS 9,654,964 B1 *  5/2017  Carames ................. H04W 4/90
2004/0192306 A1  9/2004  Elkarat et al.
(Continued)

FOREIGN PATENT DOCUMENTS

WO    2015101808 A1    7/2015

OTHER PUBLICATIONS

French Search Report and Written Opinion dated Feb. 2, 2017 for corresponding French Application No. 1654065, filed May 4, 2016.
(Continued)

*Primary Examiner* — Marcus Smith
(74) *Attorney, Agent, or Firm* — David D. Brush; Westman, Champlin & Koehler, P.A.

(57) ABSTRACT

A system including an entity of a home network configured to register geographical locations of users. On receiving a request to update the location of a user, the entity determines minimum quality of service parameters required of the visited network as a function of the service requested and of a profile of the user. These parameters and the updated quality of service of the visited network are taken into account by a traffic steering platform in order to give a positive or a negative response to the request.

5 Claims, 2 Drawing Sheets

(51) Int. Cl.
*H04W 60/04* (2009.01)
*H04W 40/12* (2009.01)
*H04W 40/20* (2009.01)
*H04W 76/18* (2018.01)
*H04W 48/08* (2009.01)
*H04W 72/08* (2009.01)

(56) References Cited

U.S. PATENT DOCUMENTS

| | | | |
|---|---|---|---|
| 2008/0020756 A1 | 1/2008 | Jiang | |
| 2008/0299911 A1* | 12/2008 | Chen | H04L 47/767 455/67.13 |
| 2012/0147767 A1* | 6/2012 | Yang | H04W 36/0044 370/252 |
| 2013/0102356 A1 | 4/2013 | Shaw | |
| 2016/0088461 A1* | 3/2016 | Jiang | H04M 15/54 455/432.1 |
| 2016/0165432 A1* | 6/2016 | Dubesset | H04W 4/14 455/433 |
| 2017/0118654 A1* | 4/2017 | Wang | H04W 12/08 |
| 2017/0289017 A1* | 10/2017 | Munnaluru | H04L 65/1073 |
| 2017/0311244 A1* | 10/2017 | Kodaypak | H04W 8/14 |

OTHER PUBLICATIONS

"3rd Generation Partnership Project; Technical Specification Group Services and System Aspects; Service accessibility (Release 6)". 3GPP TS 22.011 V6.4.0, Global System for Mobile Communications. Jun. 2004.

"Digital cellular telecommunications system (Phase 2+); Universal Mobile Telecommunications System (UMTS); Non-Access-Stratum (NAS) functions related to Mobile Station (MS) in idle mode (3GPP TS 23.122 version 9.3.0 Release 3)". ETSI TS 123 122 V9.3.0, Global System for Mobile Communications. Jun. 2010.

"LTE; General Packet Radio Service (GPRS) enhancements for Evolved Universal Terrestrial Radio Access Network (E-UTRAN) access (3GPP TS 23.401 version 9.2.0 Release 9)". ETSI TS 123 401 V9.2.0. Oct. 2009.

LTE; Traffic steering control; Representational State Transfer (REST) over St reference point (3GPP TS 29.155 version 13.0.0 Release 13). ETSI TS 129 155 V13.0.0. Jan. 2016.

Universal Mobile Telecommunications System (UMTS); LTE; Evolved Packet System (EPS); Mobility Management Entity (MME) and Serving GPRS Support Node (SGSN) related interfaces based on Diameter protocol (3GPP TS 29.272 version 9.9.0 Release 9). ETSI TS 129 272 V9.9.0. Jan. 2012.

"ETSI Technical Specification GSM 11.10 Mobile Station Conformity Specifications Version 3.23.1". ETSI/PT12/48V, ETSI/TC SMG. Dec. 1996.

Calhoun et al. "Diameter Base Protocol". Network Working Group, Request for Comments: 3588. Sep. 2003.

International Search Report dated Jul. 14, 2017 for corresponding International Application No. PCT/FR2017/051041, filed May 2, 2017.

Written Opinion of the International Searching Authority dated Jul. 14, 2017 for corresponding International Application PCT/FR2017/051041, filed May 2, 2017.

Pradeep Bhardwaj, "LTE Technology Primer V01—Documents", Nov. 8, 2014 (Nov. 8, 2014), XP055317765.

* cited by examiner

SYSTEM FOR STEERING THE TRAFFIC OF A ROAMING USER, METHODS, UNIT, AND PLATFORM USED IN THIS SYSTEM

CROSS-REFERENCE TO RELATED APPLICATIONS

This Application is a Section 371 National Stage Application of International Application No. PCT/FR2017/051041, filed May 2, 2017, the content of which is incorporated herein by reference in its entirety, and published as WO 2017/191403 on Nov. 9, 2017, not in English.

BACKGROUND OF THE INVENTION

The present invention lies in the context of steering the traffic of a roaming user in a telecommunications network, where such a "steering of roaming" mechanism is standardized by the 3GPP.

The person skilled in the art may refer more particularly to the following documents: 3GPP TS 29.155, 3GPP TS 29.272, 3GPP TS 23.401, 3GPP TS 23.122, 3GPP TS 22.011, IETF RFC 3588, and ETSI GSM 11.10.

It should be recalled that when a user is using a home public land mobile network (H-PLMN) deployed in one country by a first operator with whom the user has a subscription, "roaming" allows that user to travel outside the home network and to make use of the resources of another network, which is referred to as the visited public land mobile network (V-PLMN).

Steering of roaming is the mechanism that enables the first operator to give preference to the particular network that is visited by a user who is roaming in a geographical zone from among the various networks available in that zone.

Steering of roaming thus allows the operator of the home network to influence how traffic is shared in a given geographical zone for that operator's subscribers among the various operators present in that zone.

Document US 2004/0192306 describes a mechanism enabling the home network operator to influence how a mobile terminal in a roaming situation selects a visited network.

Unfortunately, that mechanism does not provide the home network operator with sufficient flexibility.

SUMMARY OF THE INVENTION

In a first aspect, the invention provides an entity of a home cellular mobile telephone network, the entity including a module for registering the geographical locations of users of said network, the entity being configured for:
  receiving from equipment of a network visited by the user while roaming, a request to update the location of the user, the request including at least an identifier of the user's terminal, an identifier of the visited network, and an identifier of a service requested by the user; and
  sending to the equipment a response to the request, the response being interceptable by a traffic steering platform connected in series between the entity and the equipment.

This entity is remarkable in that it is configured to insert into the response minimum quality of service parameters required of the visited network and determined as a function of the requested service and of a profile of the user in said home network.

In a second aspect, the invention provides a traffic steering platform for connecting in series between firstly an entity of a home cellular mobile telephone network including a module for registering the geographical locations of users of the network and secondly equipment of a network visited by the user in a roaming situation. The platform comprises:
  an obtaining module for obtaining updated quality of service parameters from said visited network;
  an interception module for intercepting a response issued by the entity and sent to equipment of the visited network in response to a request to update the location of a user, the response including minimum quality of service parameters requested of said visited network;
  a determination module configured for determining whether the updated quality of service parameters of said visited network are at least equivalent to said minimum quality of service parameters requested of the visited network; and
  a send module for sending to the equipment of the visited network a positive response to the location updating request solely in the event of the determination being successful.

Thus, and in general manner, the invention proposes a method of steering traffic of a user in a roaming situation in which preference is given to an operator providing the network of that operator offers the user a quality of service that is sufficient for a given service, with the "sufficient" criterion being determined as a function of the profile of the user in the home network.

The invention can thus be seen as an extension of the steering of roaming mechanism standardized by the 3GPP, this extension being entirely compatible with version 23.122 of that mechanism (non-access stratum (NAS) functions related to mobile station (MS) in idle mode).

This extension enables the operator of the home network to manage distributing the traffic of roaming users in a given geographical zone (e.g. a country) from among the various operators covering that zone and to do so with great flexibility, in particular by taking account of the service that is being requested and of the capability of the visited network to provide a quality of service that is sufficient for that service and that subscriber.

It may be observed that neither terminals nor equipment in the visited network are impacted by the invention.

The invention is particularly applicable in long term evolution (LTE) or "4G" networks.

Thus, in a particular embodiment, the above-mentioned entity and equipment are respectively a home subscriber server (HSS) entity of the home network and a mobility management entity (MME) embodiment of the visited network, the HSS and the MME communicating with each other using the Diameter protocol.

In this particular embodiment, the minimum quality of service parameters requested of said visited network may correspond to the QCI allocated to the user of the terminal in the home network for the requested service.

Thus, the preferred visited network is selected by the operator of the home network as a function of quality of service parameters such as packet priority, packet delay budget, and packet error loss.

The invention can also be applied to a 3G network.

Thus, in a particular embodiment, the above-mentioned entity and equipment are respectively a home location register (HLR) entity and a service GPRS support node (SGSN) entity of the visited network for a request to access a data service, or a mobile switching center (MSC) entity for a request to access a voice type service.

In this embodiment, the HLR communicates with the MSC or with the SSGN using the MAP protocol.

In a particular embodiment, the send module of the traffic steering platform is configured to send to the MME/SSGN/MSC equipment of the visited network a negative response to the location updating request in the event of the determination step failing.

In a particular embodiment of the invention:

the request to update the location of the user sent by the MME/SGSN/MSC equipment of the visited network to the HLR/HSS entity of the home network is an Update Location request; and the positive or negative responses sent by the traffic steering platform to the MME/SGSN/MSC equipment of the visited network are respectively Update Location Answer and Update Location Cancel responses.

In a particular embodiment, the negative update location cancel response includes an AVP field with a particular error type representative of a quality of service problem.

Correspondingly, the invention also provides a method performed by an entity of a home cellular mobile telephone network including a module for registering the geographical locations of users of said network, the method comprising:

a reception step for receiving from equipment of a network visited by said user in a roaming situation, a request to update the user location, the request including at least an identifier of the terminal of the user, an identifier of said visited network, and an identifier of the service requested by the user; and a send step for sending to said equipment a response to the request, the response being interceptable by a traffic steering platform connected in series between said entity and the equipment.

This method is remarkable in that it includes an insertion step for inserting in the response, prior to the send step, minimum quality of service parameters requested of the visited network determined as a function of said requested service and of a profile of the user in said home network.

The invention also provides a method performed by a traffic steering platform placed in series between firstly an entity of a home cellular mobile telephone network including a module for registering the geographical locations of users of the network and secondly equipment of a network visited by a the user in a roaming situation, the method comprising:

an obtaining step for obtaining updated quality of service parameters of said visited network;

an interception step for intercepting a response issued by the entity and sent to equipment of the visited network in response to a request to update the location of a user, the response including minimum quality of service parameters requested of the visited network;

a determination step for determining whether the updated quality of service parameters of said visited network are at least equivalent to the minimum quality of service parameters requested of the visited network; and a send step for sending to the equipment of the visited network a positive response to the request to the location update request only in the event of said determination being successful.

The invention also provides a traffic steering system for a user in a roaming situation, the system comprising an entity and a platform as mentioned above.

In a particular embodiment, the various steps of the method performed by the entity in accordance with the invention and/or the various steps of the method performed by the traffic steering platform of the invention are determined by computer program instructions.

Consequently, the invention also provides a computer program on a data medium, the program including instructions adapted to perform steps of a method as mentioned above.

The program may use any programming language, and be in the form of source code, object code, or code intermediate between source code and object code, such as in a partially compiled form, or in any other desirable form.

The invention also provides a computer readable data medium including computer program instructions as mentioned above.

The data medium may be any entity or device capable of storing the program. For example, the medium may comprise storage means, such as a read only memory (ROM), e.g. a compact disk (CD) ROM or a microelectronic circuit ROM, or indeed magnetic recording means, e.g. a hard disk.

The data medium may also be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF A FIRST EMBODIMENT OF THE INVENTION

Figure 1:
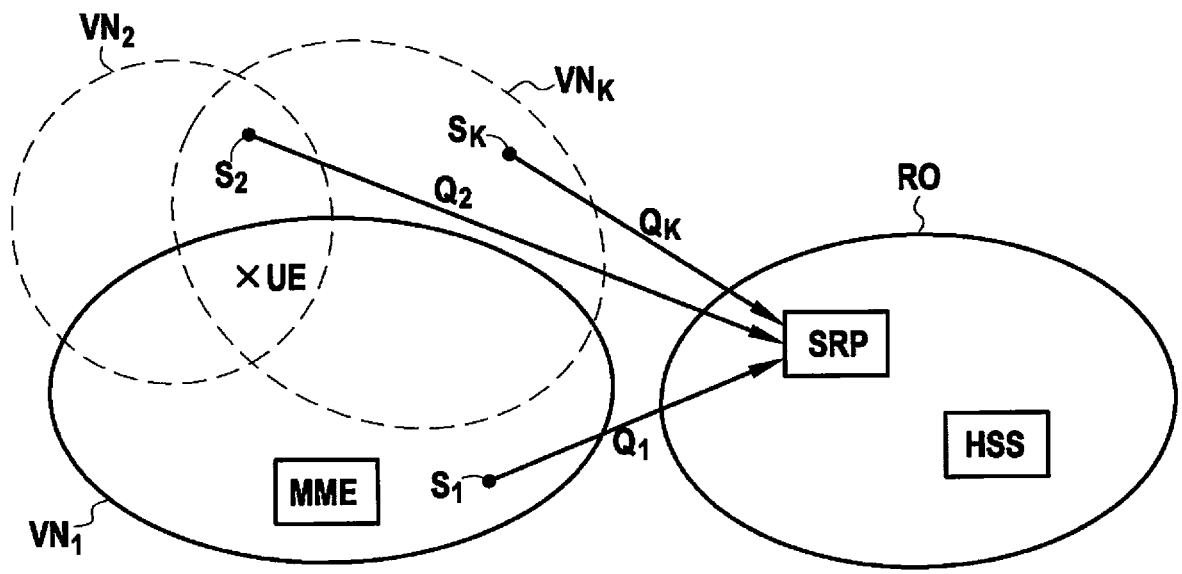
FIG. 1 shows an entity and a traffic steering platform in a particular embodiment of the invention in their environment.

FIG. 1 shows a user terminal UE of a user subscription to a first telecommunications network RO deployed in that user's country (home or nominal network), this user being on a visit in a foreign country not covered by this first network RO. This home network has a home subscriber server (HSS) entity in accordance with the invention and a platform SRP in accordance with the invention for steering roaming.

It is assumed that the user switches on the terminal UE in the foreign country and that the terminal attaches itself to a first visited long term evolution (LTE) or 4G network VN1. In other words, the user is in a roaming situation.

This first network is typically selected on the basis of information stored in the SIM card of the terminal UE.

Other 4G networks, VN2, . . . , VNk also cover the geographical zone in which the terminal UE is located.

Each of these networks VNi includes a mobility management entity (MME) and a probe Si configured for obtaining updated quality of service parameters about the network.

In practice, in most countries, the zones covered by an LTE network are also covered by a 3G network, such that the terminal UE becomes attached both to a 3G network and to a 4G network at the same time.

In this first embodiment, attention is given only to the procedure performed after the terminal UE becomes attached to the 4G network.

Figure 2:
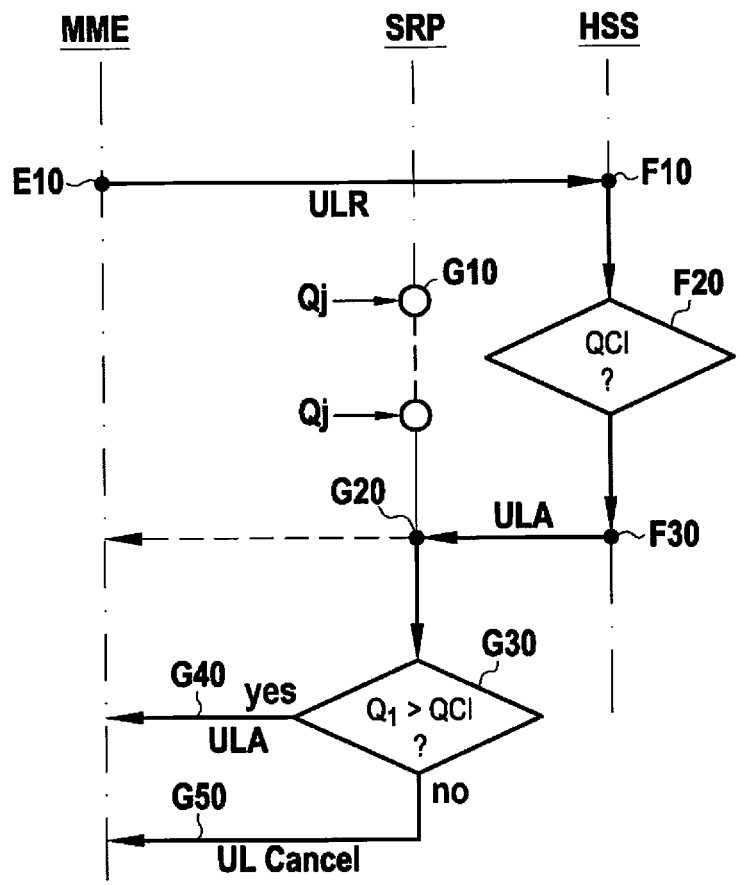
FIG. 2 shows the main steps of methods performed by the FIG. 1 entity and platform in a particular implementation of the invention.

With reference to FIG. 2, and in known manner, after the terminal UE becomes attached to the visited 4G network VN1, the MME entity of that network acts during a step E10 and using the DIAMETER protocol to send an update location request (ULR) to the HSS entity of the subscriber's home network RO in order to update the subscriber location information in the HSS.

This ULR request includes the identifier of the visited network VN1, the address of the MME entity, the IMSI identity of the terminal UE, and the service parameters requested by the user.

The HSS entity receives this ULR request during a step F10.

During a step F20, the HSS entity determines that the quality of service (QoS) class identifier (QCI) that is allocated to the user of the terminal UE by the home network RO for the requested service. This QCI is typically determined as a function of the subscription and/or the profile of the user.

During a step F30, the HSS entity uses the DIAMETER protocol to send an update location answer (ULA) response to the MME entity.

In accordance with the invention, this ULA response includes the QCI determined in step F20.

The traffic steering platform SRP is located in series between the HSS entity of the home network and the MME entity of the visited network, such that the platform SRP receives the ULA response including the QCI during a step G20.

In accordance with the invention, during a general step G10, the platform SRP regularly obtains instantaneous parameters Qj representative of the updated qualities of service on the various networks VNj available in the geographical zone being visited by the user of the terminal UE, and in particular the instantaneous parameters Q1 representative of the updated quality of service on the visited network VN1 to which the terminal UE is attached.

During a step G30, and in accordance with the invention, the platform SRP uses the updated parameters Q1 to determine whether the visited network VN1 is in a position to provide a quality of service that is equivalent to or better than that requested by the class of service QCi received in step G20.

If so, the traffic steering platform SRP acts in a step G40 by using the DIAMETER protocol to send the update location response (ULA) response to the MME entity. Under such conditions, the terminal UE remains attached to the visited network VN1 since it is suitable for giving the user access to the requested service with a quality of service that is equivalent to or greater than the QCI allocated to the user by the user's home network for an equivalent service.

Otherwise, if in step G30 the platform SRP uses the updated parameters Q1 to determine that the visited network VN1 is not capable of providing a quality of service that is at least equivalent to that required by the class of service QCi, the traffic steering platform SRP acts during a step G50 to send an Update Location Cancel response to the MME entity of the visited network.

In the presently-described embodiment, the Update Location Cancel response includes a field AVP with a particular error type representative of a QoS problem.

In compliance with the 3GPP TS 23.122, 3GPP TS 29.272, and ETSI GSM11.10 standards, the terminal UE performs authentication procedure sequences prior to changing affiliation.

If the four attempts fail, the terminal UE becomes attached to another visited network VNj available in the geographical network, and the above-described steps are executed again in identical manner, the service steering platform returning a positive Update Location Answer response to the Update Location request issued by the MME entity if and only if the visited network VNj is capable at that instant of offering the user a quality of service that is at least equivalent to the QCi stored with the user's HSS for the requested service.

The invention is described above in a scenario in which the user of the terminal UE has just switched on the terminal. Naturally, the invention is performed each time an Update Location request is sent by the MME entity, and in particular when the terminal UE becomes attached to a 4G network after losing its connection with that 4G network or with some other 4G network.

Detailed Description of a Second Embodiment of the Invention

The above-described first embodiment corresponds to performing the invention in an LTE network.

The invention may also be performed in a 3G network.

This second embodiment differs from that described above in that the Update Location requests are sent to the HLR entity of the home network in compliance with the mobile application part (MAP) protocol by a service GPRS support node (SGSN) entity of the visited 3G network for a request to access a data service, or by a mobile switching center (MSC) entity for a request to access a voice type service.

In this embodiment, the HLR determines the minimum parameters that the visited network needs to be capable of providing for the requested service as a function of the user's profile or subscription in the home 3G network. These parameters are inserted by the HLR inserts these parameters in the response to the Update Location request sent to the SGSN/MSC entity and they are intercepted by the platform SRP that is connected in series.

In this embodiment, the platform SRP regularly obtains updated quality of service parameters from the various 3G networks available in the geographical zone in which the terminal UE is to be found.

The platform SRP verifies whether the updated QoS parameters made available by the 3G network to which the terminal UE is attached are at least equivalent to the minimum parameters determined by the HLR for the requested service as a function of the profile of the user.

If so, and only under such conditions, the platform SRP returns an Update Location Answer response to the SGSN/MSCX entity of the visited network.

Detailed Description of a Third Embodiment of the Invention

The third embodiment of the invention is that in which the HSS/HLR entity of the home network of the traffic steering platform SRP performs the invention both for 3G and for 4G networks.

In this embodiment:
on receiving the Update Location request from an MME entity of a visited 4G network, the HSS/HLR entity of the platform SRP behaves as in the first embodiment of the invention; and
on receiving an Update Location request from an SGSN/MSCX entity of a visited 3G network, the HSS/HLR entity and the platform SRP behave as in the second embodiment of the invention.

In this third embodiment of the invention, the platform SRP knows the updated quality of service parameters on the 3G and 4G networks of the geographical zone of the terminal UE in order to be in a position to respond to both types of request.

Figure 3:
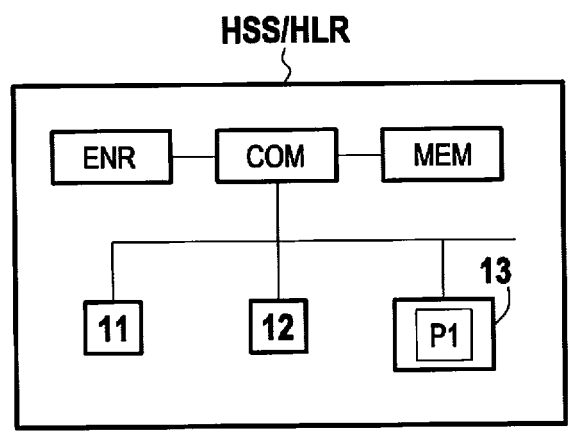
FIG. 3 shows an entity in a particular embodiment of the invention.

FIG. 3 shows an HSS/HLR entity in an embodiment of the invention. This entity includes a registration module ENR configured to register the geographical locations of users who have taken out subscriptions with an operator operating a home network in which said entity is installed.

The entity includes a communications module COM configured for communicating with MME equipment of a third party network using the DIAMETER protocol and/or with SGSN/MSC equipment of a third party network using the MAP protocol.

This communications module is configured in particular for:
receiving from such MME/SGSN/MSC equipment a UL request for updating the location of the user, this request including at least an identifier of the user's terminal, an identifier of said visited network, and an identifier of the service requested by the user; and
sending a response to the request to that equipment.

The HSS/HLR entity includes a non-volatile memory MEM storing, for each of the subscribers, and for one or more services, determined minimum quality of service parameters required of the visited network. When the visited network is an LTE network, these parameters may be QCI identifiers well known to the person skilled in the art.

In the presently-described embodiment, the HSS/HLR entity includes a processor 11, random access type memory (RAM) 12, and ROM type memory 13. The ROM 13 constitutes a medium in the meaning of the invention that stores a computer program P1 in accordance with the invention, the program including instructions for performing steps F10 to F30 as described above with reference to FIG. 2.

The program is remarkable in particular in that it includes instructions for inserting into the response that is to be sent to the MME/SGSN/MSC equipment the minimum quality of service parameters required of said visited network determined as a function of said requested service and of a profile of the user in the home network.

Figure 4:
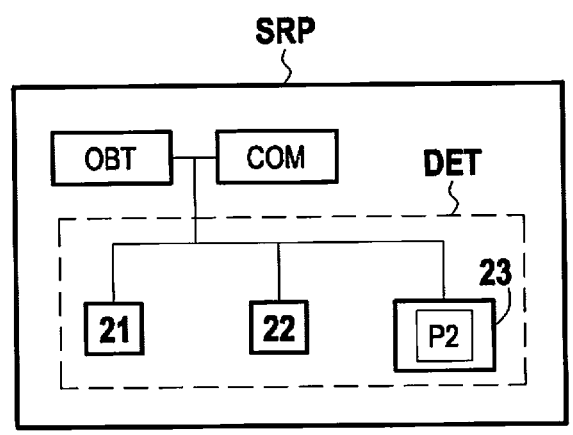
FIG. 4 shows a traffic steering platform in a particular embodiment of the invention.

FIG. 4 shows a traffic steering platform SRP in an embodiment of the invention. The platform SRP is to be located in series between firstly an HSS/HLR entity of a home cellular mobile telephone network having a module for registering the geographical locations of users of said network, and secondly MME/SGSN/MSC equipment of a network VNk visited by a roaming user.

The platform SRP has an obtaining module OBT for obtaining updated quality of service parameters from the visited network. By way of example, this obtaining module may be constituted by a module configured for communicating with a probe Sk configured for taking measurements on the network VNk in order to obtain these parameters.

The platform SRP includes a communications module COM configured for intercepting a response issued by the HSS/HLR entity and sent to the MME/SGSN/MSC equipment of the visited network and for relaying such a response, possibly after it has been modified to the equipment.

It should be recalled that the response issued by the HSS/HLR entity includes minimum quality of service parameters requested of the visited network as determined by this entity as a function of the service requested by the user and of a profile of the user in the home network RO.

In the presently-described embodiment, the platform SRP has a processor 21, a RAM type memory 22, and a ROM type memory 23. The ROM 23 constitutes a medium in the meaning of the invention storing a computer program P2 in accordance with the invention, the program including instructions for performing steps G10 to G30 as described above with reference to FIG. 2.

The program is remarkable in particular in that it includes instructions for determining whether the updated quality of service parameters of said visited network obtained by the module OBT are at least equivalent to the minimum quality of service parameters included in the intercepted response.

In this embodiment, the processor 21, a RAM type memory 22, and a ROM type memory 23 constitute a determination module DET configured for determining whether said updated quality of service parameters of said visited network are at least equivalent to said minimum quality of service parameters requested of said visited network.

Although the present disclosure has been described with reference to one or more examples, workers skilled in the art will recognize that changes may be made in form and detail without departing from the scope of the disclosure and/or the appended claims.

The invention claimed is:

1. A system comprising:
a traffic steering platform for connecting in series firstly between an entity of a home cellular mobile telephone network including a module for registering the geographical locations of users of said network and secondly equipment of a network visited by said user in a roaming situation, said platform including:
a processor; and
a non-transitory computer-readable medium comprising instructions stored thereon, which when executed by the processor configure the platform to perform acts comprising:
obtaining updated quality of service parameters from said visited network;
intercepting a response issued by said entity and sent to equipment of said visited network in response to a request to update the location of a user, said response including minimum quality of service parameters requested of said visited network;
determining whether said updated quality of service parameters of said visited network are at least equivalent to said minimum quality of service parameters requested of said visited network; and
sending to said equipment of said visited network a positive response to said location updating request solely in the event of said determination being successful.

2. The system according to claim 1, wherein the platform is further configured to send to said equipment of said visited network a negative response to said request to update location in the event of said determination failing.

3. The system according to claim 2, wherein said negative response includes a field with a particular error type representative of a quality of service problem.

4. A method performed by a system, said method comprising:
- placing a traffic steering platform in series between firstly an entity of a home cellular mobile telephone network including a module for registering the geographical locations of users of said network and secondly equipment of a network visited by a said user in a roaming situation;
- obtaining updated quality of service parameters of said visited network;
- intercepting a response issued by said entity and sent to equipment of said visited network in response to a request to update the location of a user, said response including minimum quality of service parameters requested of said visited network;
- determining whether said updated quality of service parameters of said visited network are at least equivalent to said minimum quality of service parameters requested of said visited network; and
- sending to said equipment of said visited network a positive response to said request to said location update request only in the event of said determination being successful.

5. A non-transitory computer readable data medium storing a computer program including: instructions for executing a method when the instructions are executed by a processor of a traffic steering platform, the platform connecting in series firstly between an entity of a home cellular mobile telephone network including a module for registering the geographical locations of users of said network and secondly equipment of a network visited by said user in a roaming situation, wherein the instructions configure the platform to perform acts comprising:
- obtaining updated quality of service parameters from said visited network;
- intercepting a response issued by said entity and sent to equipment of said visited network in response to a request to update the location of a user, said response including minimum quality of service parameters requested of said visited network;
- determining whether said updated quality of service parameters of said visited network are at least equivalent to said minimum quality of service parameters requested of said visited network; and
- sending to said equipment of said visited network a positive response to said location updating request solely in the event of said determination being successful.

* * * * *